US 8,489,333 B2

(12) United States Patent
Bonavides et al.

(10) Patent No.: US 8,489,333 B2
(45) Date of Patent: Jul. 16, 2013

(54) DEVICE ORIENTATION DETERMINATION

(75) Inventors: Clovis Bonavides, Houston, TX (US);
Philip William Tracadas, West University, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 36 days.

(21) Appl. No.: 13/125,403

(22) PCT Filed: May 7, 2009

(86) PCT No.: PCT/US2009/002863
§ 371 (c)(1),
(2), (4) Date: Apr. 21, 2011

(87) PCT Pub. No.: WO2010/128959
PCT Pub. Date: Nov. 11, 2010

(65) Prior Publication Data
US 2011/0196612 A1    Aug. 11, 2011

(51) Int. Cl.
*G01V 3/18* (2006.01)
(52) U.S. Cl.
USPC ............... 702/6; 702/154; 33/304; 33/316
(58) Field of Classification Search
USPC ..... 702/150–154, 6, 94, 95; 700/302; 33/302, 33/304, 313, 316
See application file for complete search history.

(56) References Cited

U.S. PATENT DOCUMENTS

| 4,732,494 | A | 3/1988 | Guers et al. |
| 5,564,193 | A * | 10/1996 | Brooks ........................... 33/302 |
| 5,623,407 | A | 4/1997 | Brooks |
| 6,179,067 | B1 | 1/2001 | Brooks |
| 6,668,465 | B2 | 12/2003 | Noureldin et al. |
| 2007/0030007 | A1* | 2/2007 | Moore ........................ 324/333 |
| 2007/0156340 | A1* | 7/2007 | Shray et al. ..................... 702/11 |
| 2009/0030007 | A1 | 1/2009 | Liao et al. |

FOREIGN PATENT DOCUMENTS

| GB | 2394779 A | 5/2004 |
| WO | WO-9821448 A1 | 5/1998 |
| WO | WO-2010128959 A1 | 11/2010 |

OTHER PUBLICATIONS

"International Application Serial No. PCT/US2009/002863, Search Report mailed Jul. 2, 2009".
"International Application Serial No. PCT/US2009/002863, Written Opinion mailed Jul. 2, 2009".

* cited by examiner

*Primary Examiner* — Manuel L Barbee
(74) *Attorney, Agent, or Firm* — Schwegman, Lundberg & Woessner, P.A.; Benjamin Fite

(57) ABSTRACT

In some embodiments, apparatus and systems, as well as methods, may operate to obtain hole azimuth data or inclination data associated with a chassis (e.g., comprising a measurement or logging tool) in a borehole using interpolated data or survey data, and to determine magnetic field orientation of the chassis using a portion of the hole azimuth data, a portion of the inclination data, relative bearing data, and Earth magnetic field orientation data by reconstructing at least a portion of borehole magnetic field data that is corrupt or missing. Additional apparatus, systems, and methods are disclosed.

24 Claims, 7 Drawing Sheets

US 8,489,333 B2

DEVICE ORIENTATION DETERMINATION

RELATED APPLICATIONS

This application is a nationalization under 35 U.S.C. 371 of PCT/US2009/002863, filed May 7, 2009, and published as WO 2010/128959 A1 on Nov. 11, 2010; which application and publication are incorporated herein by reference and made a part hereof.

BACKGROUND

A variety of devices make use of magnetic sensors to orient themselves with respect to the Earth's Geographic Coordinates. More specifically, it is common to use a tri-axial magnetometer to measure the angle of the device with respect to the Earth's magnetic field, and a tri-axial accelerometer to measure the angle of the device with respect to the Earth's gravitational field. Together, these sensors can be used to estimate the device's pointing direction in magnetic bearing coordinates, unless the gravity and magnetic fields are either parallel or anti-parallel. Using a model of the Earth's magnetic field position, a correction estimate can be applied to re-reference the device from magnetic bearing coordinates to geographic coordinates, such as the Earth System of Coordinates.

For example, one such device comprises a borehole imager that is configured to obtain images of a borehole drilled into the Earth. Six sensors (a tri-axial magnetometer and a tri-axial accelerometer) attached to the device may be used to sense the imager's orientation as it moves within the borehole to record images, so that the resulting images of the borehole surface are aligned with geographic North. However, when imaging a borehole near formations that contain iron-oxides with magnetic fields sufficient to override the Earth's magnetic field as it appears at the magnetometers, the acquired sensor data at that location may contain magnetic field readings that are corrupt, or completely missing. A lack of orientation data may also be noticed whenever there is less than a full complement of sensors (e.g., less than the six sensors noted above) attached to the device.

DETAILED DESCRIPTION

Figure 1:
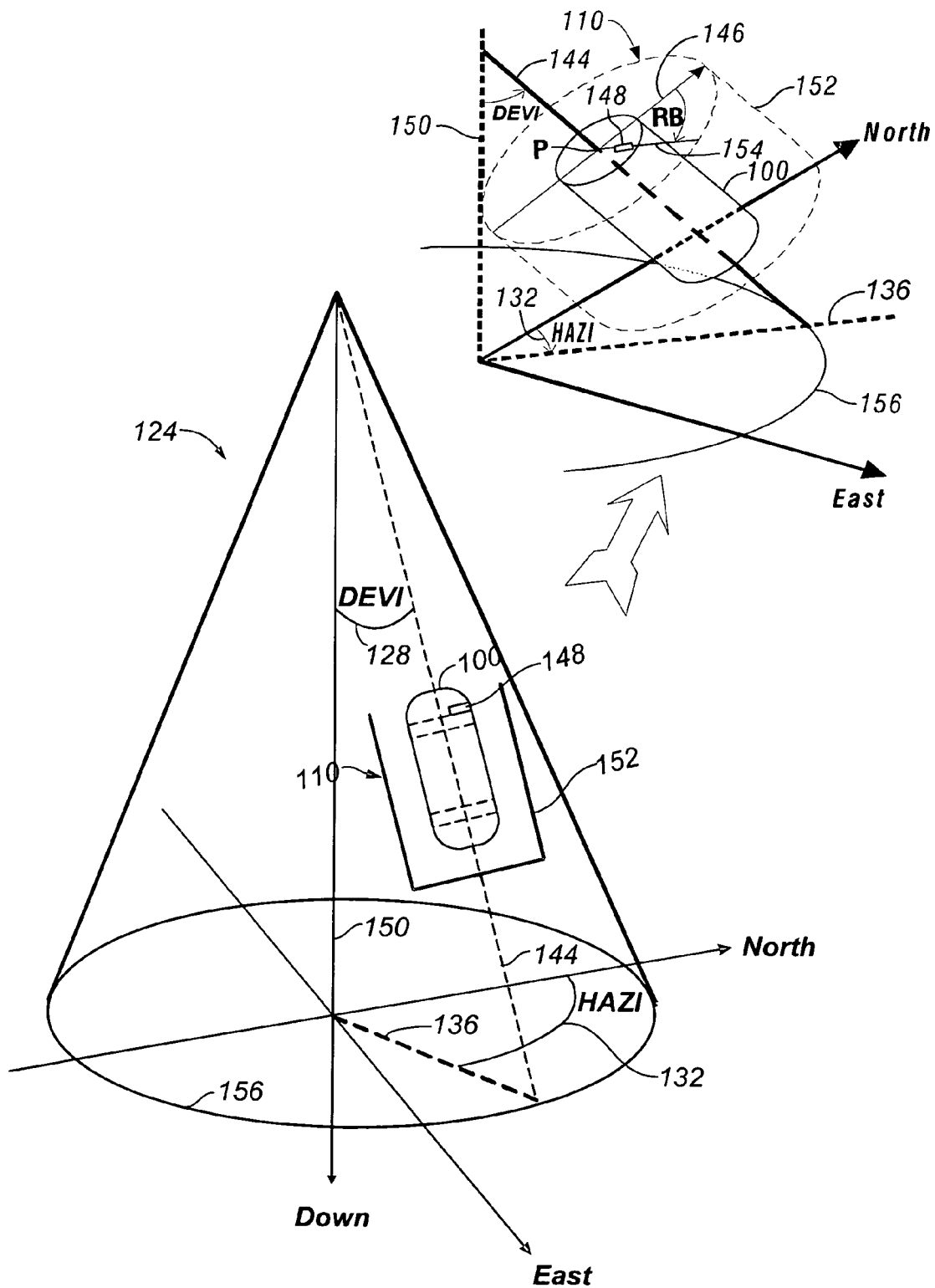
FIG. 1 illustrates the determination of device orientation in the Earth System of Coordinates (ESC) according to various embodiments of the invention.

The various embodiments described herein operate to provide orientation information by deriving or reconstructing missing or corrupt magnetic field sensor data in various applications. These mechanisms can also be used to check valid magnetometer data for correct calibration. For example, in a navigation log where the borehole tool did not rotate more than a quarter turn and/or did not change deviation by more than 90 degrees, it is very difficult to tell if the calibration of each magnetic field sensor is correct. Using the embodiments disclosed, accelerometer data and a well survey can be used to generate comparison (reconstructed magnetic field sensor) data to assess the calibration of the actual magnetic field sensor data. The noise in the actual magnetic field sensor data can also be characterized and reduced using this comparison data.

A typical tri-axial magnetic field sensor suite contains three sensor units mounted orthogonal to each other; each one of the sensor units to measure the Earth's magnetic field strength along the direction of their alignment. Similarly, a typical tri-axial acceleration sensor suite contains three sensor units (e.g., comprising piezoelectric sensors) mounted orthogonal to each other and each sensor unit measures the Earth's gravitational field strength along the direction of their alignment.

Each sensor unit responds to any change in the measured field strength along the direction of its alignment. Commonly, each sensor unit's response is given as a voltage or current, in digital or analog form, that is calibrated and then recorded as a numeric value. These values can be collected with other data over time.

The magnetic and acceleration sensor suites are typically oriented relative to each other and to the device in a convenient orientation system and then rigidly attached to the chassis (e.g., main structural element) of the device, such as a downhole tool. Readings of all sensor units at a given time are used to measure the orientation of the gravity and magnetic fields permeating the device in this orientation system, which is commonly known as TSC (tool system of coordinates). In most cases, it is desirable to find the orientation of the device in a system of coordinates used for geographic purposes; for example the ESC, which is defined by the orthogonal directions magnetic North, magnetic East, and Height (also known as "Vertical Depth").

In order to orient the device in ESC, the relationship between TSC and ESC should be known throughout the time period of interest. When magnetic field sensor data is missing or corrupt during portions of this time period, the relationship cannot be directly determined. In various embodiments, the measured relationship between TSC and ESC is used when magnetic field sensor measurements are not missing or corrupt. However, when the magnetic field sensor measurement data is missing or corrupt during portions of the time period of interest, the relationship between TSC and ESC can be interpolated over the selected portions, and then new magnetic field sensor data is calculated at each desired point such that the interpolated relationship holds. If all magnetic measurements throughout the time period of interest are corrupt or missing, another device may be used to determine the relationship between TSC and ESC, and that relationship may then be used to orient the device affected by the corrupt/missing data.

In the well-logging, measurement, and drilling industries, devices used to acquire data downhole are generally of a tubular (cylindrical) form, which makes it convenient to use a form of TSC that adopts a cylindrical system of coordinates. The zero-angle in this TSC is referenced to a physical location on the side of the device, designated as the "orienting key" or simply the "key". The position angle of this reference key relative to the gravity field vector (G) can be measured by a tri-axial accelerometer package and is usually designated as the Relative Bearing (RB) when the position vector of the device key is projected on a vertical plane and the angle measured relative to the high side of the borehole (assumed to run in the direction of minus G). In other words, RB is the angular position of the device key relative to the high side of the borehole.

The tri-axial accelerometer package may also provide the inclination (also called Deviation or DEVI) of the device's cylindrical axis relative to the vertical direction (assumed to run in the direction of positive G). For example, a tri-axial accelerometer might have the Ay sensor point away from the key, the Az sensor point down the cylinder axis (which conventionally points downhole into the Earth), and the Ax sensor pointing orthogonally to both Ay and Az in a right-handed coordinate system. In general, it is assumed that the Z axis of the device is coincident with the borehole longitudinal (Z) axis. Given these conditions, equation [1] may be formulated as follows:

$$DEVI = \arctan(\sqrt{A_x^2 + A_y^2}/A_z), \quad [1]$$

where Ax, Ay, Az are measured accelerometer values available for each axis at a point in time.

In some embodiments, DEVI is measured using a calibrated hemisphere, with a camera recording the position of the hemisphere, centered around the tool axis, that has concentric latitude lines drawn to represent inclination relative to the tool axis. DEVI can also be measured using a pendulum or a gimbaled, eccentered weight driving a potentiometer, where the potentiometer reading is translated to DEVI from the vertical direction. This mechanism can also be adapted to measure the RB angle.

FIG. 1 illustrates the determination of device 100 orientation in the ESC according to various embodiments of the invention. At each data collection point during the time of interest, the position of the device 100 can be located on the surface of a vertical cone 124 with an opening angle given by DEVI 128. Combining the magnetic field sensor package readings with the accelerometer readings using standard equations provides the Hole Azimuth (HAZI) angle 132, which is the angle in the horizontal plane 156 between the magnetic North direction and the horizontal projection 136 of the Z axis 144 of the device 100. The DEVI 128 and HAZI angle 132 together locate the Z axis 144 of the device 100 (and hence borehole 110) on the cone 124, and thus locate the device 100 and borehole 110 in the ESC.

The angle between the key 148 on the device 100 and the high side 152 of the borehole 110, or the RB, can be derived from the Ax and Ay accelerometer sensor measurement data. In this way, the position of the device 100 reference key 148 relative to the high side vector 146 of the cone 124 is known. It should be noted that the angle RB is measured in the TSC, while the angles HAZI and DEVI are measured in the ESC.

The high side 152 of the borehole 110 at each depth comprises a direction line 146 normal to the borehole axis 144, passing through and pointing away from the cone axis 150. The horizontal projection 136 of the line 146 normal to the borehole axis 144 and passing through the cone axis 150 also intersects the magnetic North horizontal direction line to define the HAZI angle 132.

The angle RB, which is measured clockwise while looking downhole, is the angle between the lines 146 and 154. Line 154 joins the tool reference key 148 to the tool axis 144, making a right angle with the tool axis 144 and intersecting the tool axis 144 at point P. Line 146 intersects the tool axis 144 at point P, as well as at the high side 152 of the bore hole 110. The RB angle is conserved when projected onto a vertical plane (perpendicular to HAZI vector 136 and through line 150) and the projection of the borehole high side vector 146 on this vertical plane is shared with the ESC vertical reference; hence, the value of RB is the same in both the TSC and the ESC.

Since the location of sensors on the device 100 (e.g., imaging sensors, acoustic receivers, etc.) relative to the reference key 148 are known in the TSC, the position of the sensors relative to the ESC can be deduced using RB, ΔRB (the bearing angle about tool axis 144 between each sensor and the key 148), and elementary vector math or trigonometry. For example, equation [2] can be formulated as follows:

$$RB = \arctan(Ax/Ay), \quad [2]$$

where Ax and Ay are accelerometer values from each axis X, Y at a particular point in time.

Thus, during the acquisition of navigation data over time periods when the magnetometer data is missing or corrupt, the DEVI 128 and RB are not affected.

During the time when magnetometer data is available, the HAZI angle 132 can be determined at each time point along the travel of the device 100. In the well-logging industry, for example, the HAZI angle 132 does not rapidly or arbitrarily change with time or measured depth because boreholes are typically drilled along a substantially continuous path with a low radius of curvature. Therefore, during times when the magnetometer data is missing or corrupt, the HAZI angle 132 may be linearly interpolated along the measured borehole distance using valid HAZI angles from surrounding depths.

For intervals along the borehole 110 characterized by missing or corrupt magnetic field data, when such intervals occur at the beginning or end of an entire measured section, or when the entire measured section has corrupt or missing magnetic field data, a survey of HAZI angles can be used to render the desired data values. This survey can be provided by another device (e.g., a gyroscope) which has traversed the same path either before or after the device that is presently used to acquire the data. Since the HAZI angle 132 used here is referenced to magnetic North, dereferencing survey HAZI angle data from true North (or some other reference) can be accomplished by accessing equations that are well known to those of ordinary skill in the art.

The TSC and ESC reference coordinate systems can be related by a series of common vector rotations that can be accomplished using matrix operators. One example of such rotations includes the use of Euler Matrices, and the corresponding rotations are usually termed "Euler Rotations". Three Euler rotations are sufficient to make the transformation between the ESC and the TSC, to derive reconstructed magnetometer data values that can be used to replace missing or corrupt values. Any necessary translations, if needed, are immediate, as the third (e.g., Z) axis of the device 100 and borehole 110 systems of coordinates are assumed to be substantially coincident. The sensors may be mounted at the same depth (e.g., Z position) as the device 100, or not, as long as the device 100 rotates substantially rigidly within Earth's magnetic and gravitational fields. That is, when one end of the device 100 rotates or tilts, the other end of the device 100, and all points in-between on the device 100, should rotate or tilt by substantially the same amount in the same direction (e.g., with substantially no twisting or bending), or at least in a manner such that there is no substantial movement between the various sensors of interest on the device 100.

The magnetic inclination (MI), which is the angle between the horizontal (generally perpendicular to the vector G) and Earth's magnetic field (north-pointing vector M) is roughly constant in magnitude and direction for short travel distances (perhaps up to 25 miles) of the device 100. Therefore, a suitable MI value can be provided using: MI=90°−arcos (G·M) (i.e., the dot product of the G and M vectors). This can be calculated continuously using the acquired data, or as an average over many data collection points when the magnetometers correctly sense the magnetic field surrounding the device 100. In the ESC, the direction vector of the magnetic field is thus MAG=[cos(MI); 0; sin(MI)]. The East directional component is zero, since the ESC is referenced to magnetic North in this case.

Alternatively, if the magnetometer values are missing or corrupt, the Earth's magnetic field can be measured in some other way, or modeled. In some embodiments, the Earth's magnetic field inclination and declination are obtained from a publicly-available database. That is, a database of the Earth's magnetic field data that has previously been determined over the surface of the earth relative to the ESC can be used. In some embodiments, the magnetic field inclination MI is determined using a model.

For example, a model of the Earth's magnetic field, such as the IGRF 10 model, and the latitude and longitude and depth of the device 100 can be used to calculate the MI. While the IGRF 10 model is well known to those of ordinary skill in the art, readers that desire to learn more about such models can refer to the 10$^{th}$ Generation International Geomagnetic Reference Field (IGRF) software, which includes the Geomag 6.1 C software and model, provided by the International Association of Geomagnetism and Aeronomy (IAGA), Division V, Geomagnetic Observatories, Surveys and Analyses; Working Group V-MOD (Geomagnetic Field Modeling).

For a magnetic field sensor package having the My sensor pointed toward the device key 148, the Mz sensor pointed down along the cylinder axis of the device 100 (which is substantially parallel to the longitudinal axis of the borehole 110 into the earth), and the Mx sensor pointing orthogonal in a right-handed coordinate system to both My and Mz, the reconstructed sensor values (MXr, MYr, MZr) can be calculated using equations [3], as follows:

$$M_{Xr}=[\sin(RB)*\cos(DEVI)*\cos(HAZI)+\cos(RB)*\sin(HAZI)]*\cos(MI)-R,$$

$$M_{Yr}=[\cos(RB)*\cos(DEVI)*\cos(HAZI)-\sin(RB)*\sin(HAZI)]*\cos(MI)-S,$$

and $$M_{Zr}=\sin(DEVI)*\cos(HAZI)*\cos(MI)+\cos(DEVI)*\sin(MI), \qquad [3]$$

where R=sin(RB)*sin(DEVI)*sin(MI), and S=cos(RB)*sin(DEVI)*sin(MI).

It is to be noted that, without loss of generality, those of ordinary skill in the art will understand that these equations may be changed depending on the orientation systems chosen and the labeling of sensor axes within those orientation systems. Nevertheless, it is to be understood that the use of common vector rotations, such as Euler rotations, may operate to rotate a vector representing the direction of the magnetic field in any ESC reference system to any TSC reference system.

The reconstructed sensor values $M_{Xr}$, $M_{Yr}$, and $M_{Zr}$ may be provided in specific units (e.g., nanoTesla). As shown, the reconstructed values simply represent a unit vector pointing in the direction of the magnetic field. Thus, the desired magnitude in specific units for this vector may be obtained by multiplication of the unit vector by the desired magnitude (Md). Hence, the reconstructed magnetic field vector of desired magnitude may be given as Mr=Md*[MXr; MYr; MZr]. Alternatively, when MAG is a direction vector, MAG can be multiplied by Md and equations [3] redrawn without the simplifications to yield the reconstructed sensor values $M_{Xr}$, $M_{Yr}$, and $M_{Zr}$, in the desired units directly. The desired magnitude may be given by calculating the magnitude or average magnitude from valid measurements of M (the non-reconstructed magnetic field vector), as measured by the device 100 or by a model of the magnetic field evaluated at the location of the device 100. When the value of M is corrupt or missing, that value of M can be replaced by the reconstructed value of Mr. Thus, many embodiments may be realized.

Figure 2:
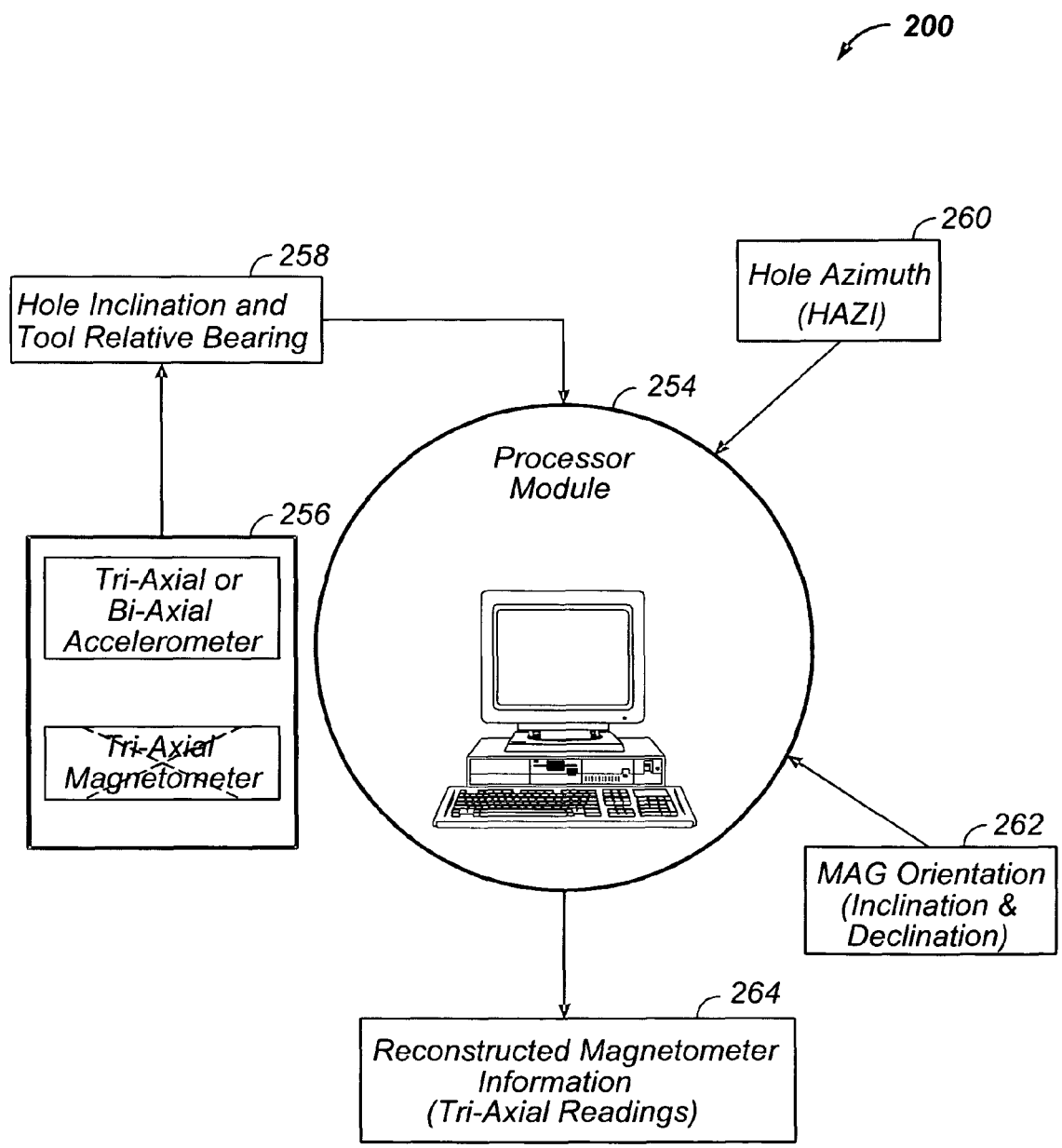
FIG. 2 is a block diagram of a magnetic field data reconstruction process according to various embodiments of the invention.

For example, FIG. 2 is a block diagram of a magnetic field data reconstruction process 200 according to various embodiments of the invention. Here it can be seen that a processor module 254 operates on a variety of data, as discussed with respect to FIG. 1. The processor 254 may be located downhole, or topside—at the surface.

Beginning on the left-hand side of FIG. 2, the potential measurement of data from magnetometers and multi-axis accelerometers at block 256 is obtained. For example, a bi-axial or tri-axial accelerometer can be used to provide periodic measurements of the Earth's gravitational field. A tri-axial magnetometer may, or may not provide valid magnetic field measurement data. These measurements, in turn, can be used to determine the hole inclination DEVI and device RB at block 258. Even when valid magnetic field measurement data is not available (e.g., the measured Earth magnetic field data is corrupt or missing), the RB and DEVI can be determined in others ways, as described previously.

The HAZI angle and MAG orientation vector are likewise periodically determined at blocks 260 and 262, respectively, as described above, and submitted to the processor 254. Finally, the information resulting from operations at blocks 258, 260, and 262 are used by the processor 254 to develop reconstructed sensor values, resulting in a reconstructed magnetic field vector 264 Mr that can be used in the place of a non-reconstructed vector M determined from valid measurements of the Earth's magnetic field in the borehole.

Figure 3:
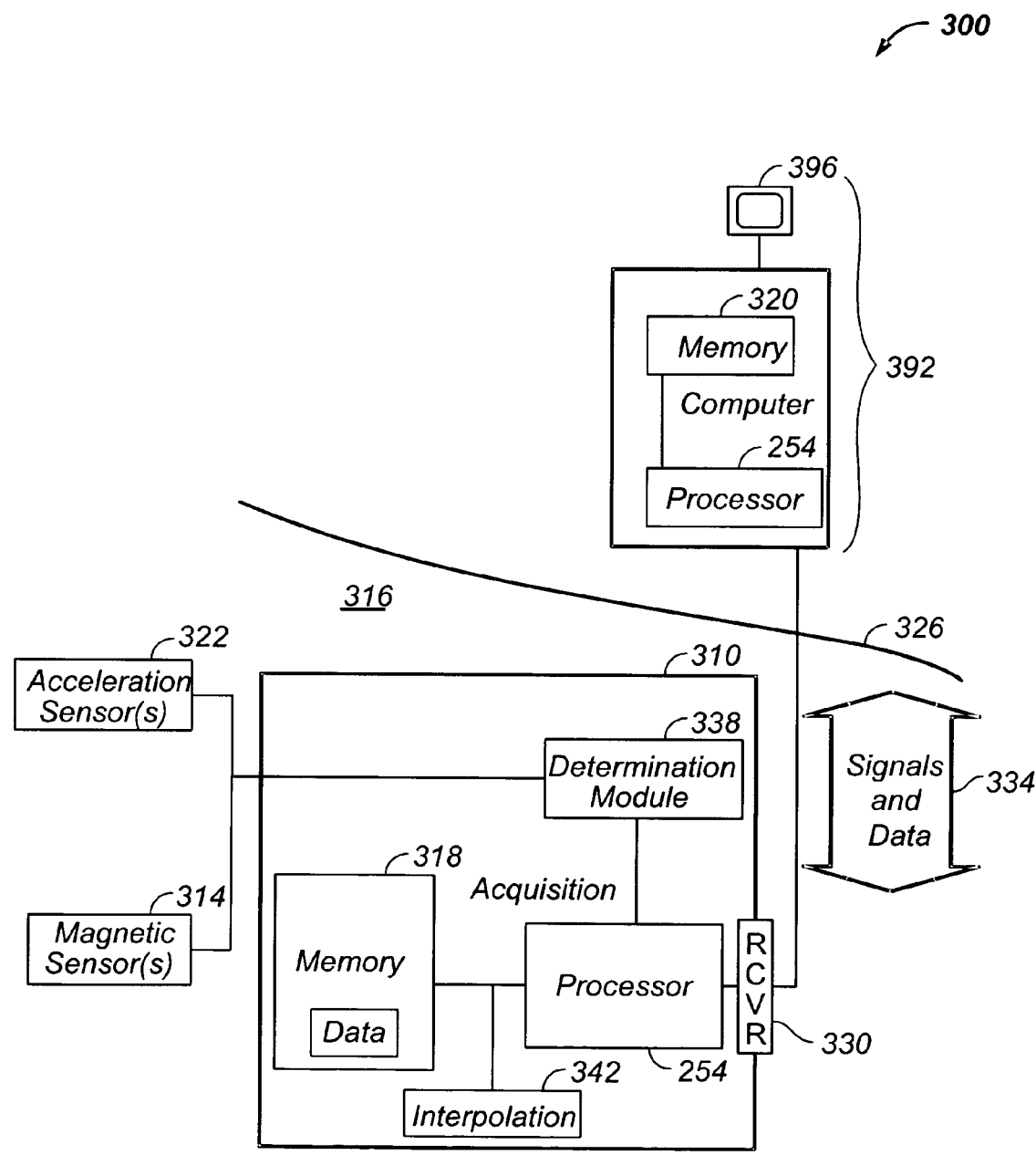
FIG. 3 is a block diagram of a magnetic field reconstruction apparatus according to various embodiments of the invention.

FIG. 3 is a block diagram of a magnetic field reconstruction apparatus 300 according to various embodiments of the invention. The apparatus 300, which can be used to reconstruct missing or corrupt magnetic field data, may comprise a chassis (e.g., a downhole tool) 310 and one or more magnetic field sensors 314 attached to the chassis 310 to obtain magnetic field data from within a borehole. In some embodiments, no magnetic field sensors 314 are attached to the chassis 310, or one or more of the attached sensors 314 are broken, or otherwise incapable of providing magnetic field data from within a borehole (e.g., the formation composition is such that no signals are received or formation signals corrupt the Earth's magnetic field). In these cases, the magnetic field data will be missing.

The apparatus 300 may also comprise a memory 318, 320 to receive hole azimuth data, or inclination data, or both, associated with the chassis 310 using at least one of interpolated data or survey data. One or more processors 254 may be included in the apparatus 300, located either downhole 316 or at the surface 326, and coupled to the memory 318, 320 to reconstruct a portion of the magnetic field data that is corrupt or missing.

To reconstruct the corrupt or missing data, one or more of hole azimuth data, relative bearing data, and/or Earth magnetic field data will be used. In some embodiments, measured inclination data will also be used (e.g., if there are more than two accelerations sensors 322 that form part of the apparatus 300, then the inclination of the chassis 310 can be provided directly from the data provided by one or more acceleration sensors 322, and is not derived some other way, as discussed previously).

Using the apparatus 300, the magnetic field orientation of the chassis 310 can be determined by reconstructing the missing/corrupt magnetic field data. To "reconstruct" as used in this document means to provide completely new data in place of missing or corrupt data. That is, the process of reconstruction replaces missing or corrupt data values with substituted reconstructed values—reconstruction does not involve making corrective adjustments to incorrect data.

A common configuration and common magnetic field sensor type is a tri-axial magnetometer having three magnetometers deployed in mutually orthogonal directions. Thus, one or more magnetic field sensors 314 of the apparatus 300 may comprise a tri-axial magnetometer.

A common configuration of an acceleration sensor 322 is a multi-axis accelerometer, such as a tri-axial unit comprising three accelerometers deployed in mutually orthogonal directions. A bi-axial unit can also be used, with two accelerometers deployed orthogonal to each other and substantially perpendicular to the longitudinal axis (Z) of the chassis/borehole. Thus, one or more acceleration sensors 322 may be attached to the chassis 310, and used to obtain gravitational field data from within the borehole. Other sensors that can be used to obtain gravitation field data include a weight coupled to a z-axis rotor having a displacement angle that is measured relative to the key of the device.

The Earth magnetic field data can be stored in local memory 318 if reconstruction of the corrupt/missing magnetic field data is to occur downhole 316, or a remote memory 320 if the reconstruction is to occur at the surface 326. Thus, the apparatus 300 may comprise a memory 318, 320 to store the Earth magnetic field data. Either or both memories 318, 320 may likewise be used to receive reconstructed magnetic field data provided by the processor 254. Measured magnetic field data, as well as reconstructed magnetic field data, and graphical representations of the chassis 310 oriented in the borehole with respect to ESC, or some other magnetic reference system, can all be displayed on a display 396 coupled to the processor 254, and forming part of the apparatus 300.

The hole azimuth data (e.g., survey or interpolated), as well as other data 334 can be sent to the apparatus 300 (e.g., the chassis 310) from the surface 326 or stored in memory 320. If a bi-axial accelerometer is used as the acceleration sensor 322, hole inclination data (survey or interpolated) may be provided from the surface (e.g., from a surface logging station 392) or stored in the memory 318 as well. Thus, in some embodiments, the apparatus 300 may include a receiver 330 to receive at least one of survey data or interpolated data comprising at least one of hole azimuth data or hole inclination data.

A specific module can be used to determine when data reconstruction would be useful. Thus, in some embodiments, the apparatus 300 may comprise a determination module 338 to determine that a portion of the magnetic field data acquired within the borehole is corrupt or missing.

It should be noted that magnetic field data can be missing for a variety of reasons, some of which have been noted previously. For example, one or more magnetic field sensors 314 attached to the chassis 310 may have stopped working entirely. Or, in some embodiments, the device used to acquire downhole data may have no magnetic field sensor attached. In either case, a survey can be used to construct magnetic field data logs. The survey data can be stored in the memory 318 or sent to the memory 318 in real-time in order for reconstruction of the magnetic field data to occur in real-time or near real-time. In some embodiments, non-magnetic sensor data may be acquired downhole, and then combined with surface survey data after the downhole data is acquired to provide the desired adjustments to the magnetic field vector.

A specific module can also be used to interpolate hole azimuth and/or inclination data between stations in the borehole. Thus, the apparatus 300 may comprise an interpolation calculation module 342 to determine the hole azimuth data, the inclination data, or both, using interpolation. Still further embodiments may be realized.

For example, in some embodiments one or more processors 254 may operate on data from two accelerometers 322 plus DEVI (borehole deviation) and HAZI (borehole magnetic azimuth) data, or from three accelerometers 322 and HAZI data alone, to determine chassis 310 rotational orientation (AZI) relative to the ESC. Typically, the two non-gyroscopic acceleration sensors 322 are not aligned with each other, so that they do not point in the same direction. In addition, neither is typically oriented so as to point down the borehole/tool/chassis axis. In this way, the two sensors 322 can sample cross-borehole gravity. A third non-gyroscopic sensor 322 may be used to measure a component of gravitation field data looking along the borehole/tool axis, rather than perpendicular to it.

Thus, an apparatus 300 may comprise a chassis 310 and two non-gyroscopic acceleration sensors 322 attached to the chassis 310, with the acceleration sensors 322 used to obtain primary gravitation field data from within a borehole. The apparatus 300 may also comprise a first memory 318 to store DEVI information and HAZI information. Alternatively, or in addition, the apparatus 300 may comprise a third non-gyroscopic acceleration sensor 322 to obtain secondary gravitation field data and a second memory 320 to store the HAZI information.

The apparatus 300 may also include a processor 254 to couple to the first memory 318 or the second memory 320 and to determine the AZI of the chassis 310 relative to the ESC based on the primary gravitation data, the DEVI information, and the HAZI information, or the primary and the secondary gravitation field data and the HAZI information. Thus, the processor 254 may be used to determine magnetic field (Mr) data associated with the chassis 310 over an interval of the borehole when the magnetic field data is missing or corrupt.

In some embodiments, a tri-axial accelerometer is used to provide rotational orientation data. Thus, the two non-gyroscopic acceleration sensors 322 and the third non-gyroscopic acceleration sensor 322 may comprise a tri-axial accelerometer.

Magnetic field vector data Mr in three axes may be constructed using RB (perhaps via the relationship arctan(Ax/Ay)), DEVI, HAZI, and MI. Thus, the magnetic field data Mr may be determined using the primary gravitation data, the DEVI information, the HAZI information, and MI data.

Survey and/or interpolated HAZI and DEVI information may be received downhole. For example, the HAZI information may be taken from survey data, and the DEVI information may be obtained by interpolation. Both the survey HAZI information and interpolated DEVI information may be transmitted from the surface 326, to a receiver 330 downhole. Other combinations are possible. Thus, the apparatus 300 may comprise a receiver 330 to receive at least one of survey data or interpolated data comprising at least one of the HAZI information or the DEVI information.

A module may be used to determine HAZI and/or DEVI information downhole using interpolation, perhaps from stored survey data. The apparatus 300 may thus comprise an interpolation module 342 to determine at least one of the DEVI information or the HAZI information using interpolation. Still further embodiments may be realized.

Figure 4:
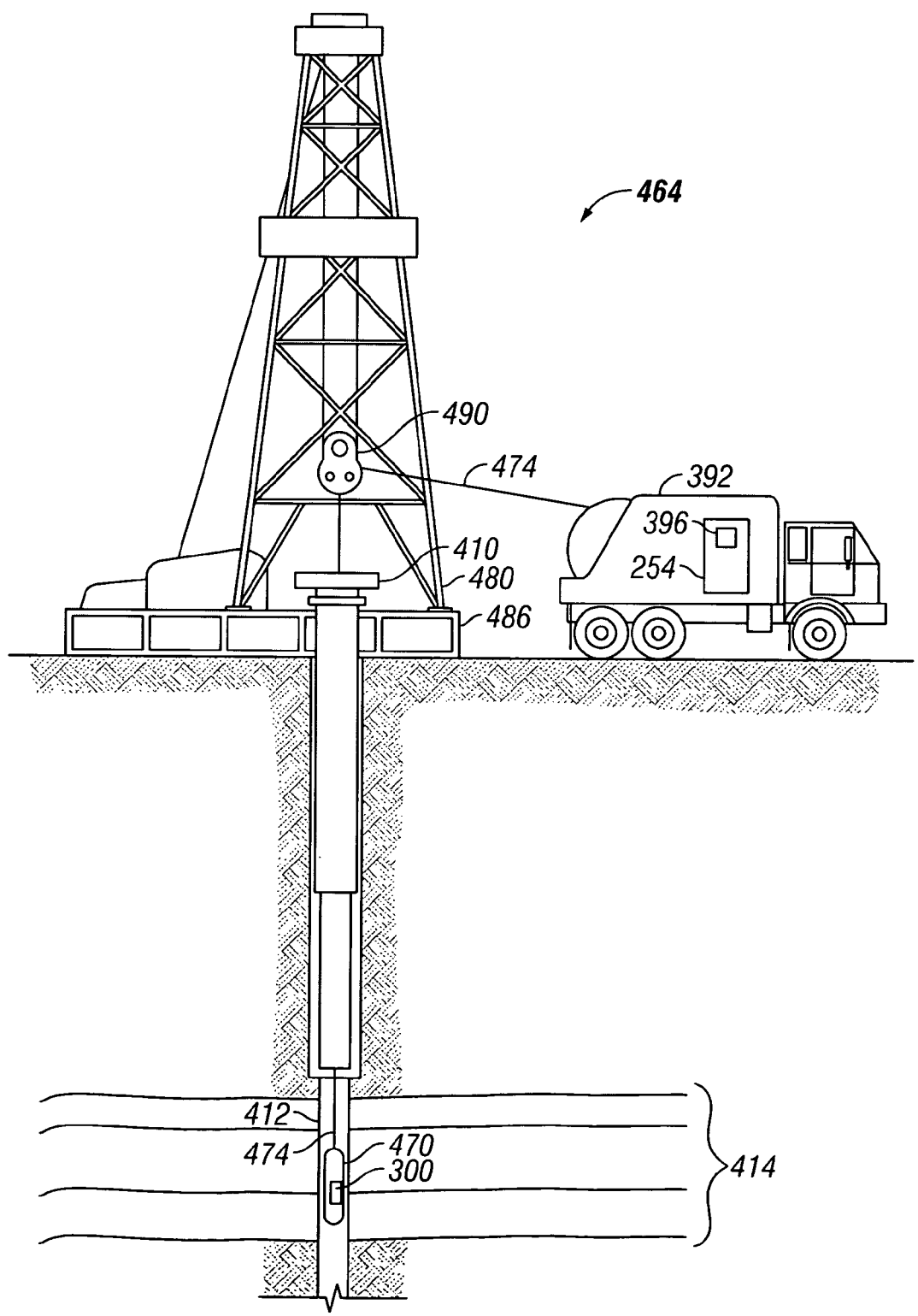
FIG. 4 illustrates a wireline system embodiment of the invention.
Figure 5:
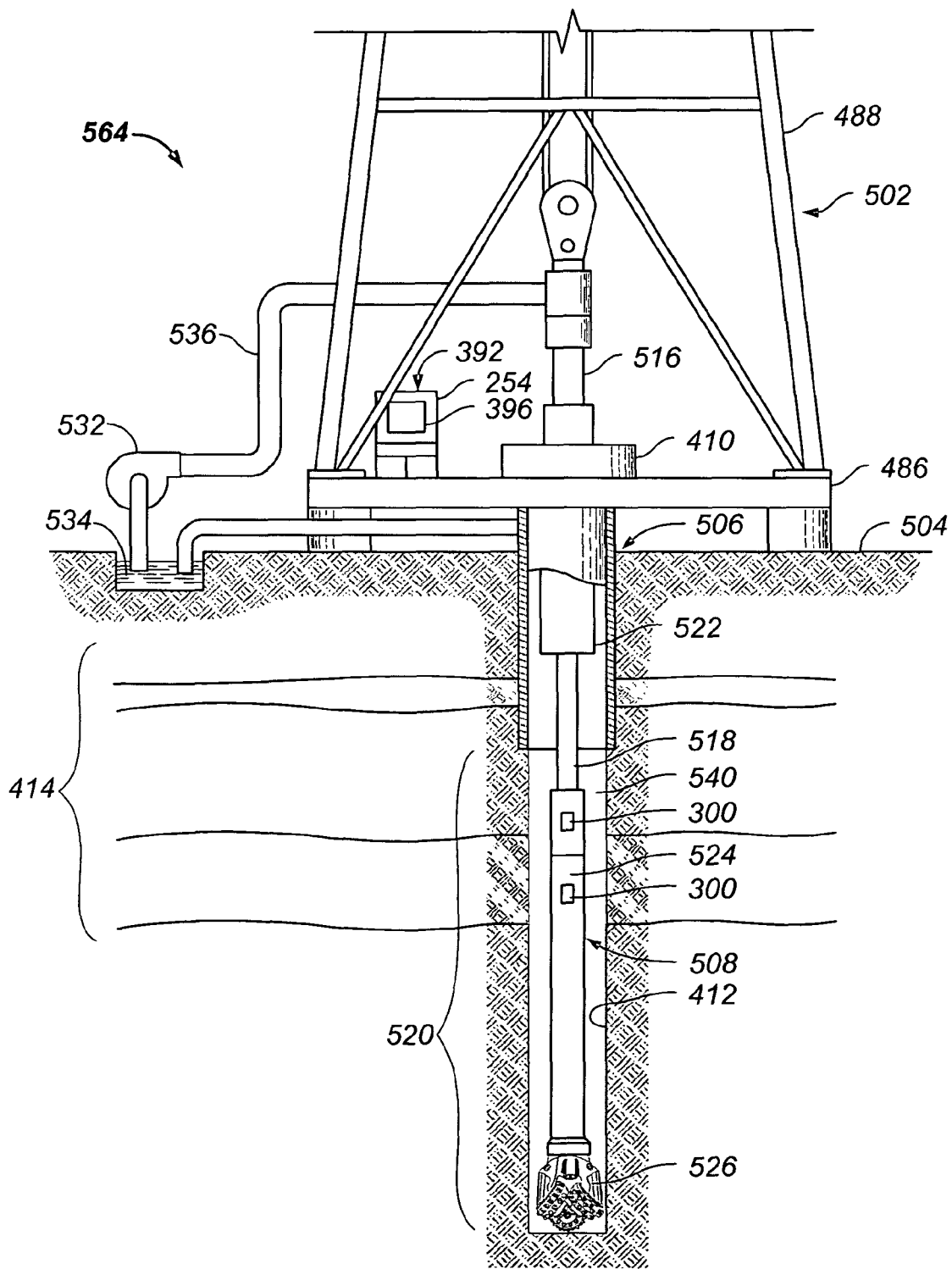
FIG. 5 illustrates a drilling rig system embodiment of the invention.

For example, FIG. 4 illustrates a wireline system 464 embodiment of the invention, and FIG. 5 illustrates a drilling rig system 564 embodiment of the invention. Thus, systems 464 may comprise portions of a tool body 470 as part of a wireline logging operation, or of a downhole tool 524 as part of a downhole drilling operation. FIG. 4 shows a well during wireline logging operations. A drilling platform 486 is equipped with a derrick 480 that supports a hoist 490.

Drilling of oil and gas wells is commonly carried out using a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the tool body 470 is lowered to the bottom of the region of interest and subsequently pulled upward at a substantially constant speed.

During the upward trip, instruments (e.g., accelerometers and/or magnetometers in the apparatus 300) included in the tool body 470 may be used to perform measurements in the borehole 412 as they pass by. The measurement data can be communicated to a surface logging facility 392 for storage, processing, and analysis. The logging facility 392 may be provided with electronic equipment for various types of signal processing, which may be implemented by any one or more of the components of the apparatus 300 in FIG. 3. Similar log data may be gathered and analyzed during drilling operations (e.g., during logging while drilling (LWD) operations).

Turning now to FIG. 5, it can be seen how a system 564 may also form a portion of a drilling rig 502 located at the surface 504 of a well 506. The drilling rig 502 may provide support for a drill string 508. The drill string 508 may operate to penetrate a rotary table 410 for drilling a borehole 412 through subsurface formations 414. The drill string 508 may include a Kelly 516, drill pipe 518, and a bottom hole assembly 520, perhaps located at the lower portion of the drill pipe 518.

The bottom hole assembly 520 may include drill collars 522, a downhole tool 524, and a drill bit 526. The drill bit 526 may operate to create a borehole 412 by penetrating the surface 504 and subsurface formations 414. The downhole tool 524 may comprise any of a number of different types of tools including MWD (measurement while drilling) tools, LWD tools, and others.

During drilling operations, the drill string 508 (perhaps including the Kelly 516, the drill pipe 518, and the bottom hole assembly 520) may be rotated by the rotary table 410. In addition to, or alternatively, the bottom hole assembly 520 may also be rotated by a motor (e.g., a mud motor) that is located downhole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation 414 cuttings created by operating the drill bit 526.

Thus, referring now to FIGS. 2-5, it may be seen that in some embodiments, the systems 464, 564 may include a drill collar 522, a downhole tool 524, and/or a wireline logging tool body 470 to house one or more apparatus 300. Thus, for the purposes of this document, the term "housing" may include any one or more of a drill collar 522, a downhole tool 524, and a wireline logging tool body 470 (all having an outer wall to enclose or attach to instrumentation, sensors, fluid sampling devices, pressure measurement devices, and data acquisition systems). The downhole tool 524 may comprise an LWD tool or MWD tool. The tool body 470 may comprise a wireline logging tool, including a probe or sonde, for example, coupled to a logging cable 474. Many embodiments may be realized.

In some embodiments, the orientation of the tool 470, 524 can be displayed in real time, with respect to true North, magnetic North, or grid North, for example. Thus, the system 464, 564 may comprise a display 396 to display the orientation of the downhole tool with respect to a magnetic field reference, as well as magnetic field data, either measured or reconstructed, or both, perhaps in graphic form. A system 464, 564 may also include computation logic, perhaps as part of a surface logging facility 392, or a processor 254, to receive signals from apparatus 300 and to reconstruct corrupt or missing magnetic field measurement data.

Thus, a system 464, 564 to reconstruct missing or corrupt earth magnetic field data may comprise a downhole tool 470, 524, and one or more apparatus 300 at least partially housed by the downhole tool 470, 524. The downhole tool may comprise a wireline tool 470 or an MWD tool 524.

The system 464, 564 may comprise a memory (e.g., memory 318, 320 of FIG. 3) to receive magnetic field data determined by the processor 254, perhaps using RB, DEVI, HAZI, and MI. The memory may be used to receive magnetic field data provided by the processor 254, wherein the magnetic field data is associated with the downhole tool 470, 524 and is to be determined over an interval of the borehole 412 when the magnetic field data is missing or corrupt.

The device 100; boreholes 110; 412; key 148; process 200; processor 254; blocks 256, 258, 260, 262; apparatus 300; chassis 310; sensors 314, 322; memories 318, 320; data 334; receiver 330; determination module 338; interpolation calculation module 342; logging facility 392; display 396; rotary table 410; formation 414; systems 464, 564; tool body 470; drilling platform 486; derrick 480; hoist 490; logging cable 474; drilling rig 502; well 506; drill string 508; Kelly 516; drill pipe 518; bottom hole assembly 520; drill collars 522; downhole tool 524; drill bit 526; mud pump 532; mud pit 534; and hose 536 may all be characterized as "modules" herein. Such modules may include hardware circuitry, and/or a processor and/or memory circuits, software program modules and objects, and/or firmware, and combinations thereof, as desired by the architect of the apparatus 300 and systems 464, 564, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 300 and systems 464, 564 are intended to provide a general understanding of the structure of various embodiments, and they are not intended to serve as a complete description of all the elements and features of apparatus and systems that might make use of the structures described herein.

Applications that may incorporate the novel apparatus and systems of various embodiments include a variety of electronic systems, such as televisions, cellular telephones, personal computers, workstations, radios, video players, vehicles, portable devices containing acceleration sensors (i.e. certain cellular telephones and PDAs) and location technology (e.g., GPS (Global Positioning System) location technology), signal processing for geothermal tools and smart transducer interface node telemetry systems, among others. Some embodiments include a number of methods.

Figure 6:
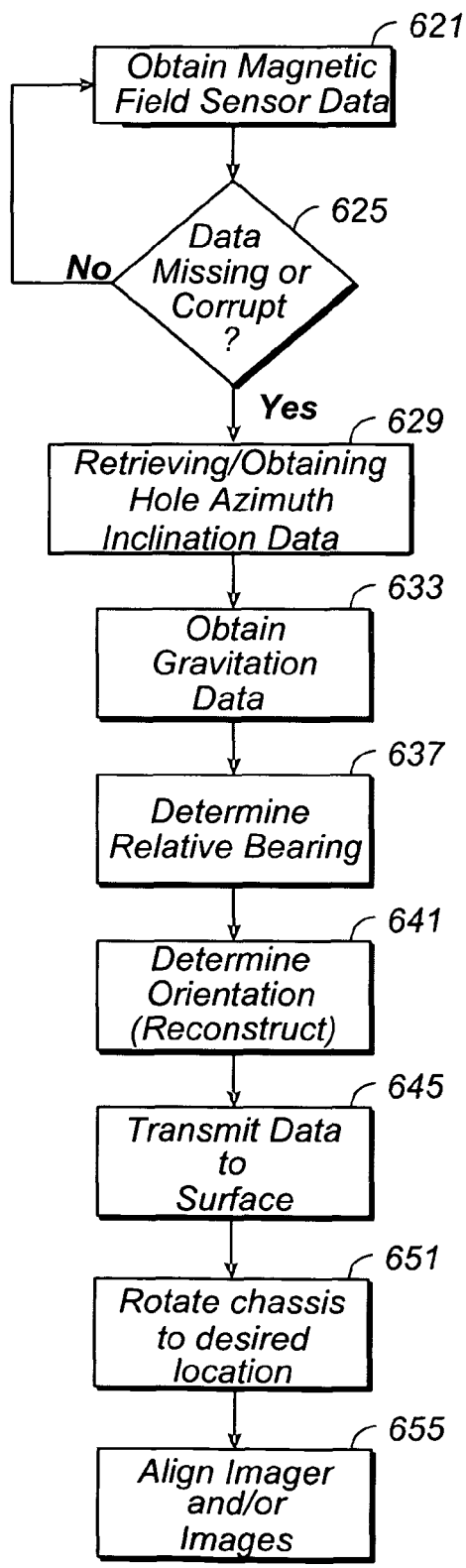
FIG. 6 is a flow chart illustrating several methods according to various embodiments of the invention.

For example, FIG. 6 is a flow chart illustrating several methods 611 according to various embodiments of the invention. As noted previously, most downhole tools include at least two accelerometers (perhaps orthogonal to each other and to the long axis of the tool), or some other relative bearing sensor. Some tools are equipped with three accelerometers—with the third located along long axis of the tool. If the latter is the case, then inclination (DEVI) information can be obtained directly.

Any number of magnetometers (e.g., none, one, two, or three) may also be attached to the tool chassis. Those that are present may work some of the time or none of the time. "Working some of the time" means that they fail to provide completely valid data, or operate to provide invalid data by sensing the formation magnetic field and the Earth's magnetic field together in such a way that the formation field corrupts the measurement of the Earth's magnetic field. During those intervals when correct readings are obtained, it is possible to use them to measure HAZI, and it may be reasonable to interpolate HAZI measurements across the zones where the magnetometers don't operate properly. In this case, no magnetic field survey may be needed.

Data acquired from some or all of the sensors can be stored onboard the tool or sent to the surface in real time, or in near real-time using a buffered transmission. Stored tool data or stored surface-received data can be processed at a later time. Any or all of the processing described with respect to the methods 611 may occur downhole, or at the surface, obviating the need to send processed data to the surface (e.g., see the description of block 645 below).

Survey data, if needed, may be obtained before or after the tool data acquisition run. If a survey is available before the tool run, the survey data may be stored in the tool or sent to the tool real-time in order for the tool to reconstruct magnetic field data in real-time. If the tool can detect when the magnetic field measurement returns to normal (e.g., assessing validity of the data by measuring the gravity to magnetic field angle or the total magnetic field strength), and the acquisition process can wait for the time when the magnetometers are able to reacquire the Earth's magnetic field, intervening missing data can be reconstructed without a survey.

If there are no magnetometers on the tool, or the magnetometers providing corrupt data never return to providing a normal output, a survey can be used to construct magnetic field data logs. Likewise, if sensor data is acquired at the surface in real-time, it can be processed on the surface at the rig site or in a real-time operations center, perhaps via a data link to the rig. The processing options are the same as when the data is stored in the tool before the tool run.

With two non-parallel accelerometers, neither of which is pointing solely along the Z axis of the tool, the RB (rotation of the tool from the borehole high side) can be sensed. Other sensors can be used to measure this angle directly as well. If these two accelerometers are calibrated to the total gravity field magnitude (Gtot), then the computed output of a third accelerometer "sensor" (pseudo-Az) can be derived using the sum of squares, and DEVI can be computed via equation [1]. Alternatively, DEVI can be calculated from the relationship: $\arcsin(\sqrt{Ax^2+Ay^2}/Gtot)$. In either case, it is assumed that the tool is right-side up, and non-horizontal. If these conditions are not satisfied, the DEVI can be determined from a well survey (e.g., using a gyroscope attached to a wireline logging tool). With three accelerometers, DEVI and RB can be computed directly. Thus, either the calculated DEVI or the survey DEVI can be used, depending on the circumstances under which data are acquired.

If the magnetometers that are present operate properly some of the time, such that missing/corrupt magnetic field data is to be reconstructed, there is the option to combine their output with data from the three accelerometers (or two accelerometers that are calibrated, and calculated pseudo-Az values used in a non-horizontal or upside down hole) to calculate HAZI. Then HAZI can be interpolated through the acquisition zones where magnetometer data is missing or corrupt, if the interpolation interval is reasonable (i.e., less than thousands of feet apart).

MI can be obtained from the magnetic field model. Or, if some magnetometers operate properly over a length of time, then the MI can be measured using the vector dot product. In some cases, a magnetic field meter can be used apart from the tool near the rig site (e.g., within a thousand meters, not near any locally generated magnetic fields) and within a few days of the tool run (before or after) to measure the local field.

After determining which sensors are available, and which logs are to be used (e.g., computed or surveyed), and where the data will be processed (within the tool or at the surface, in real-time or post-run, or some combination of these) then reconstruction can be accomplished using equation [3]. In some embodiments, two parts of equation [3] (corresponding to magnetic field readings for two axes) can be determined, with the third part (i.e., the third axis reading) computed via the sum of squares and observations of the magnetic inclination (to determine the sign of the result). Thus, some method embodiments may include deriving a third magnetic vector in each one of a plurality of magnetic vector sets. The third vector can be derived by processing first and second magnetic vectors along with a known total value of the Earth magnetic field at the chassis location, as follows:

$$M_3 = \sqrt{(M_{\text{total}}^2 - M_1^2 - M_2^2)}. \quad [4]$$

The reconstructed values can be used to make a new log by creating the log from scratch, or by replacing corrupt or missing values in an existing log. In short, magnetic field data reconstruction includes a variety of possibilities with respect to when and where the various activities described herein are conducted. Adjustment and/or inferences of the RB, DEVI, HAZI, or MI values can be made from the sensor readings (e.g., the DEVI readings may be filtered) to improve results. Thus, many embodiments may be realized.

For example, a processor-implemented method 611 to execute on one or more processors that perform the method, to reconstruct corrupt or missing magnetic field data, may begin at block 621 with obtaining magnetic field sensor data from one or more magnetic field sensors. The method 611 may include, at block 625, determining whether magnetic field sensor data is missing or corrupt. If the magnetic field sensors continue to operate normally, or if all desired magnetic sensor field data continues to be available (e.g., it is not missing for some reason), then the method loops from block 625 to block 621.

Otherwise, the activity at block 625 may include detecting a failure related to the sensors by initiating alternative data generation methods with respect to hole azimuth data. For example, the method 611 may include beginning to obtain hole azimuth data, or inclination data, or both, at block 629, in response to determining a failure in the output from one or more magnetic field sensors attached to the chassis at block 625. Other reasons to go on to block 629 may include determining that the magnetic sensor field data is missing (for a variety of reasons), inaccurate, or erroneous.

Thus, the method 611 may continue on to block 629 with obtaining at least one of hole azimuth data or inclination data associated with a chassis in a borehole using at least one of interpolated data or survey data. The activity at block 629 may include determining primary hole azimuth angles from another portion of the magnetic field data that is not missing or corrupt (or from survey data), and gravitational field data; and interpolating secondary hole azimuth angles from the primary hole azimuth angles over a longitudinal distance of the borehole defined approximately by the distance over which the magnetic field data is missing or corrupt. The method 611 may go on to block 633 to include obtaining gravitational field data from at least one acceleration sensor attached to the chassis, and then determining the RB data at block 637 from the gravitational field data.

Gravitational field data may also be obtained using an accelerometer sensor comprising a mechanical instrument, such as a weight coupled to a z-axis rotor having an angular displacement that is measured relative to the key of the device. Any other instrument that provides gravitational field data may be included within the term of "accelerometer sensor".

The method 611 may go on to block 641 to include determining the magnetic field orientation of the chassis using at least three of: a portion of the hole azimuth data, a portion of the inclination data, RB data, and Earth magnetic field orientation data by reconstructing at least a portion of borehole magnetic field data that is corrupt or missing.

Therefore, some embodiments of the method 611 include obtaining gravitational field data, obtaining hole azimuth data (as well as hole inclination data if needed), and determining the magnetic field orientation of the chassis using the azimuth data, relative bearing data, Earth magnetic field orientation data, and if needed, inclination data. The RB can be determined using accelerometers, or a mechanical gravitational field indicator (e.g., high-side or key indicator). Earth magnetic field data can be determined from public sources, or measured. Inclination data can be calculated if all three accelerometers in the sensor suite or a mechanical inclinometer are functioning. In addition, the inclination data can be calculated using a non-parallel, two-sensor calibrated unit as described previously.

Determining the magnetic field orientation may comprise determining the magnetic field orientation of the chassis with respect to a magnetic field reference, such as magnetic North, grid North, or true North. This value may depend on the hole azimuth angle and magnetic dip angle used in the various equations.

Reconstruction may comprise obtaining the inclination data of the chassis relative to a vertical direction from gravitational field data, the vertical direction defined by a gravitational force. Reconstruction may also include obtaining the angle between a chassis reference (e.g., a key) and a high side of the borehole from gravitational field data. This angle is sometimes called the RB angle.

Reconstruction may include determining a relative position angle between the chassis reference and the Earth magnetic field vector defined by the geographic location of the tool using common vector rotation operations. Euler rotation operations are an example of common vector rotation operations. The common vector rotation operations may use RB angles, inclination angles, and hole azimuth angles to reconstruct the portion of the magnetic field data that is missing or corrupt.

Reconstruction may include determining original hole azimuth data not included in the calculated hole azimuth data by using measured magnetic field data (e.g., measured by a magnetometer) in the borehole when the magnetic field data is not missing or corrupt. Thus, original hole azimuth data can be determined from regular magnetometer data, such as that provided by a tri-axial magnetometer, when the Earth magnetic field data is provided.

The method 611 may include, at block 645, transmitting the magnetic field orientation of the chassis to a surface location. The orientation data transmitted may include orientation information obtained as a result of using regular (measured) magnetic field data, as well as reconstructed magnetic field data. Thus, the orientation information may be determined entirely downhole, and later sent to the surface for storage, display, and/or analysis. In some embodiments, all available sensor data (valid and corrupt/missing) may be stored in chassis memory or recorded realtime into a database on the surface. Then, well after the tool has been retrieved from the borehole, the data can be recovered and reviewed. Magnetic field data that is discovered to be corrupt or missing can then be reconstructed. This can even occur when no survey is available during a logging run, but is provided at some later time. Many variations and additional embodiments may be realized.

For example, data from two accelerometers plus DEVI and HAZI information, or data from three accelerometers and HAZI alone can be used to determine chassis orientation (AZI) relative to the ESC. Thus, the method 611 may comprise obtaining primary gravitation field data provided by two non-gyroscopic acceleration sensors mounted to a chassis within a borehole (at block 633), and one of retrieving borehole magnetic azimuth (HAZI) information and borehole deviation (DEVI) information from a first memory (at block 629), or obtaining secondary gravitation field data from a third non-gyroscopic acceleration sensor (at block 633) and retrieving the HAZI information from a second memory (at block 629).

The method 611 may continue on to determining the rotational orientation (AZI) of the chassis relative to an Earth System of Coordinates (ESC) at block 637 based on the primary gravitation field data, the HAZI information, and the DEVI information, or the primary and the secondary gravitation field data and the HAZI information.

When data from three accelerometers is available, DEVI can be determined from the relationship: $\arctan(\sqrt{Ax^2+Ay^2}/Az)$. Thus, the method 611 at block 629 may comprise determining the DEVI information as the arctangent of a quotient, the numerator of the quotient comprising a square-root of a sum of squares, and the denominator of the quotient derived from the secondary gravitation field data.

The chassis orientation relative to the ESC can be determined as from the relationship: $AZI=HAZI+\arctan(\tan(RB)/\cos(DEVI))$. Thus, the method 611 at block 637 may comprise determining the AZI of the chassis as a sum of the HAZI information and the arctangent of a quotient, the numerator of the quotient comprising a tangent of chassis relative bearing, and the denominator of the quotient comprising a cosine of the DEVI information.

The chassis, as part of a downhole tool, can be controlled so as to move azimuthally to a predetermined location. Thus, the method 611 at block 651 may comprise rotating the chassis, comprising a downhole tool, in an azimuthal direction to arrive at a desired location with respect to the ESC.

As noted previously, M data may be good over some portion of the acquisition activity, and missing or corrupt in others. Thus, many actions can be used to provide a complete record of the M data. For example, the activity at block 641 may comprise determining a first portion of magnetic field data associated with the chassis over an interval of the borehole when the first portion of the magnetic field data is missing or corrupt. Vector rotation operations can be used to relate the ESC and TSC coordinate systems. Thus, the first portion of the magnetic field data may be determined using vector rotation operations.

Magnetic field vector Mr data in three axes may be constructed using RB (from the relationship arctan(Ax/Ay)), DEVI, HAZI, and the MI. Thus, the first portion of the magnetic field data can be determined using the primary gravitation data, the DEVI information, the HAZI information, and MI data.

HAZI information can be determined using good magnetic field data, and also over intervals of missing or corrupt magnetic field information, via interpolation of the HAZI information that is determined using the good magnetic field data. Thus, the method 611 may further comprise determining a primary portion of the HAZI information from a second portion of the magnetic field data that is not missing or corrupt, and the primary gravitation field data; and then interpolating a secondary portion of the HAZI information from the primary portion of the HAZI information over a longitudinal distance of the borehole defined approximately by the interval (of the borehole when the first portion of the magnetic field data is missing or corrupt).

HAZI information can be determined using survey information, and also over intervals of missing or corrupt magnetic field information, via interpolation of the surveyed HAZI information. Thus, the method 611 may comprise determining a primary portion of the HAZI information from survey data; and then interpolating a secondary portion of the HAZI information from the primary portion of the HAZI information over a longitudinal distance of the borehole defined approximately by the interval (of the borehole when the first portion of the magnetic field data is missing or corrupt).

As noted in several instances, the RB can be determined via the relationship arctan(Ax/Ay). Thus, the activity at block 637 may comprise obtaining an angle between a chassis reference and a high side of the borehole from the primary gravitation field data.

Stored data may also be accessed to construct magnetic field data if the sensors stop working. Thus, the method 611 may include, at block 629 beginning the retrieving or the obtaining in response to determining a failure in output from one or more magnetic field sensors attached to the chassis.

The AZI of the chassis, relative to the ESC, can be sent to the surface for further processing. Thus the method 611, at block 645, may comprise transmitting the rotational orientation of the chassis to a surface location.

An image, or images taken by an imager, can be aligned using the chassis AZI information. Thus, when the chassis comprises a borehole imager, the method 611 at block 655 may include aligning one of the borehole imager or images acquired by the borehole imager, according to the AZI of the chassis. Acoustic tools can also use the AZI information for referencing stress measurements in the ESC.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 7:
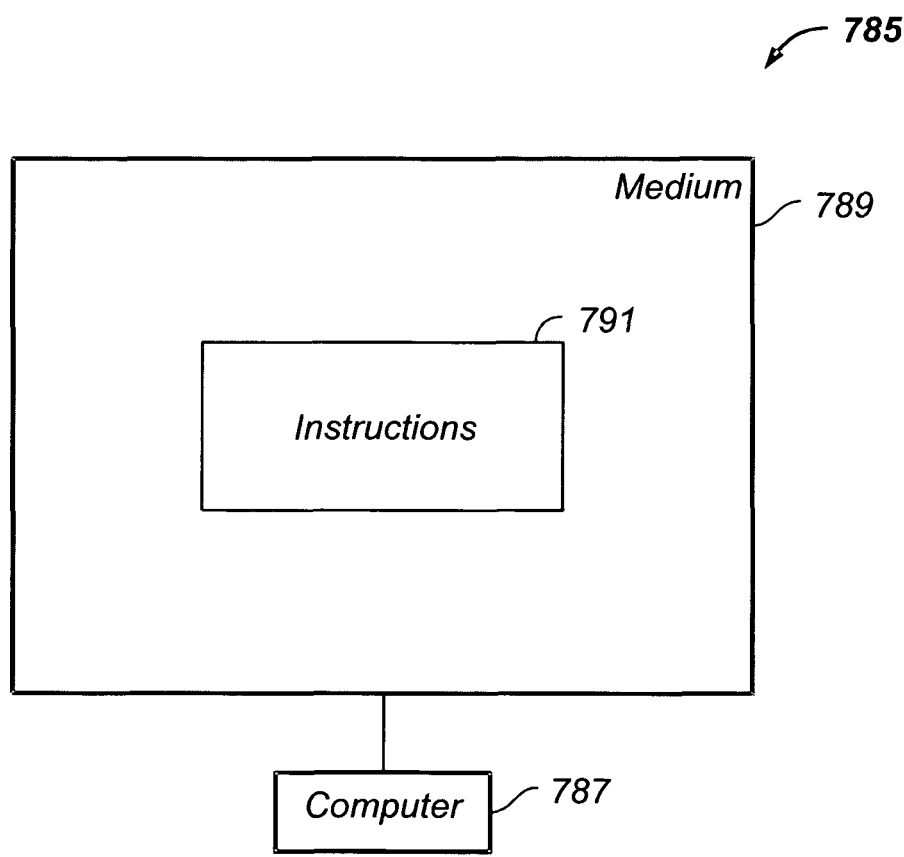
FIG. 7 is a block diagram of an article according to various embodiments of the invention.

For example, FIG. 7 is a block diagram of an article 785 of manufacture according to various embodiments, such as a computer, a memory system, a magnetic or optical disk, or some other storage device. The article 785 may include a processor 787 coupled to a machine-accessible medium such as a memory 789 (e.g., removable storage media, as well as any memory including an electrical, optical, or electromagnetic conductor) having associated information 791 (e.g., computer program instructions and/or data), which when accessed, results in a machine (e.g., the processor 787) performing any actions described with respect to the apparatus of FIG. 3, the systems of FIGS. 4 and 5, or the methods of FIG. 6.

Using the apparatus, systems, and methods disclosed, tool orientation data acquired with industry-standard navigation packages that contain accelerometers and magnetometers, or accelerometers only and a separate well survey, in formations or in well casing (e.g. metal casing) that corrupt the magnetic signal, can now be corrected to yield orientations in the ESC. Both old and new data sets can be processed using these techniques. In this way, oriented through-casing (pseudo open-hole) logging can be used to produce oriented data substantially as accurate as open-hole oriented logs. Such operations can significantly reduce risk to the operation/exploration company while at the same time controlling time-related costs.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a chassis;
two non-gyroscopic acceleration sensors attached to the chassis, the acceleration sensors to obtain primary gravitation field data from within a borehole;
one of a first memory to store borehole deviation (DEVI) information and borehole magnetic azimuth (HAZI) information, or a third non-gyroscopic acceleration sensor to obtain secondary gravitation field data and a second memory to store the HAZI information, wherein the HAZI information comprises interpolated information and/or survey information over an interval of the borehole where magnetic field data associated with the chassis and the interval is missing or corrupt; and
a processor to couple to the first memory or the second memory and to determine a rotational orientation (AZI) of the chassis relative to an Earth System of Coordinates (ESC) based on the primary gravitation data, the DEVI information, and the HAZI information, or the primary and the secondary gravitation field data and the HAZI information.

2. The apparatus of claim 1, wherein the two non-gyroscopic acceleration sensors and the third non-gyroscopic acceleration sensor comprise a tri-axial accelerometer.

3. The apparatus of claim 1, wherein the processor is to determine the magnetic field data as reconstructed magnetic field data.

4. The apparatus of claim 3, wherein the magnetic field data is determined using the primary gravitation data, the DEVI information, the HAZI information, and magnetic inclination (MI) data.

5. The apparatus of claim 1, further comprising:
a receiver to receive at least one of the HAZI information or the DEVI information comprising survey data or interpolated data.

6. The apparatus of claim 1, further comprising:
an interpolation module to determine at least one of the DEVI information or the HAZI information using interpolation.

7. A system, comprising:
a downhole tool; and
an apparatus at least partially housed by the downhole tool, the apparatus comprising:
two non-gyroscopic acceleration sensors attached to the downhole tool, the at least two acceleration sensors to obtain primary gravitation field data from within a borehole;
one of a first memory to store borehole magnetic azimuth (HAZI) information and borehole deviation (DEVI) information, or a third non-gyroscopic acceleration sensor to obtain secondary gravitation field data and a second memory to store the HAZI information, wherein the HAZI information comprises interpolated information and/or survey information over an interval of the borehole where magnetic field data associated with the downhole tool and the interval is missing or corrupt; and
a processor to couple to the first memory or the second memory and to determine a rotational orientation (AZI) of the downhole tool relative to an Earth System of Coordinates (ESC) based on the primary gravitation data, the DEVI information, and the HAZI information, or the primary and the secondary gravitation field data and the HAZI information.

8. The system of claim 7, wherein the downhole tool comprises one of a wireline tool or a measurement while drilling tool.

9. The system of claim 7, comprising:
a memory to receive the magnetic field data provided by the processor.

10. The system of claim 7, comprising:
a display to display orientation of the downhole tool with respect to a magnetic field reference.

11. A processor-implemented method to execute on one or more processors that perform the method, comprising:
obtaining primary gravitation field data provided by two non-gyroscopic acceleration sensors mounted to a chassis within a borehole;
one of retrieving borehole magnetic azimuth (HAZI) information and borehole deviation (DEVI) information from a first memory, or obtaining secondary gravitation field data from a third non-gyroscopic acceleration sensor and retrieving the HAZI information from a second memory, wherein the HAZI information comprises interpolated information and/or survey information over an interval of the borehole where magnetic field data associated with the chassis and the interval is missing or corrupt; and
determining, using the one or more processors, the rotational orientation (AZI) of the chassis relative to an Earth System of Coordinates (ESC) based on the primary gravitation field data, the HAZI information, and the DEVI information, or the primary and the secondary gravitation field data and the HAZI information.

12. The method of claim 11, further comprising:
determining the DEVI information as the arctangent of a quotient, a numerator of the quotient comprising a square-root of a sum of squares, and a denominator of the quotient derived from the secondary gravitation field data.

13. The method of claim 11, further comprising:
determining the AZI of the chassis as a sum of the HAZI information and the arctangent of a quotient, a numerator of the quotient comprising a tangent of chassis relative bearing, and a denominator of the quotient comprising a cosine of the DEVI information.

14. The method of claim 11, further comprising:
rotating the chassis, comprising a downhole tool, in an azimuthal direction to arrive at a desired location with respect to the ESC.

15. The method of claim 11, further comprising:
determining orientation data including the magnetic field data as reconstructed magnetic field data.

16. The method of claim 15, further comprising:
determining the reconstructed magnetic field data using vector rotation operations.

17. The method of claim 15, wherein the reconstructed magnetic field data is determined using the primary gravitation data, the DEVI information, the HAZI information, and magnetic inclination (MI) data.

18. The method of claim 15, further comprising:
determining a primary portion of the HAZI information from magnetic field data that is not missing or corrupt, and the primary gravitation field data; and
interpolating a secondary portion of the HAZI information from the primary portion of the HAZI information over a longitudinal distance of the borehole defined approximately by the interval.

19. The method of claim 15, further comprising:
determining a primary portion of the HAZI information from the survey information; and
interpolating a secondary portion of the HAZI information from the primary portion of the HAZI information over a longitudinal distance of the borehole defined approximately by the interval.

20. The method of claim 11, further comprising:
obtaining an angle between a chassis reference and a high side of the borehole from the primary gravitation field data.

21. An article comprising:
a machine-accessible device, the machine-accessible device having instructions stored therein, wherein the instructions, when accessed, result in a machine performing:
obtaining primary gravitation field data provided by two non-gyroscopic acceleration sensors mounted to a chassis within a borehole;
one of retrieving borehole magnetic azimuth (HAZI) information and borehole deviation (DEVI) information from a first memory, or obtaining secondary gravitation field data from a third non-gyroscopic acceleration sensor and retrieving the HAZI information from a second memory, wherein the HAZI information comprises interpolated information and/or survey information over an interval of the borehole where magnetic field data associated with the chassis and the interval is missing or corrupt; and
determining, using one or more processors, the rotational orientation (AZI) of the chassis relative to an Earth System of Coordinates (ESC) based on the primary gravitation field data, the HAZI information, and the DEVI information, or the primary and the secondary gravitation field data and the HAZI information.

22. The article of claim 21, wherein the instructions, when accessed, result in a machine performing:
beginning the retrieving or the obtaining in response to determining a failure in output from one or more magnetic field sensors attached to the chassis.

23. The article of claim 21, wherein the instructions, when accessed, result in the machine performing:
transmitting the rotational orientation of the chassis to a surface location.

24. The article of claim 21, wherein the chassis comprises a borehole imager, and wherein the instructions, when accessed, result in the machine performing:
aligning one of the borehole imager or images acquired by the borehole imager, according to the AZI of the chassis.

* * * * *